United States Patent
Someshwar et al.

(10) Patent No.: US 7,461,377 B2
(45) Date of Patent: Dec. 2, 2008

(54) METHOD AND APPARATUS FOR AUTOMATICALLY MANAGING CAPABILITIES IN A VIRTUAL PRINTER GROUP

(75) Inventors: Ravi Someshwar, Redwood City, CA (US); Nick Hartzel, St Paul, MN (US); Margaret Motamed, Foster City, CA (US); Ramgopal Vidyanand, Cupertino, CA (US)

(73) Assignee: Electronics for imaging, Inc., Foster City, CA (US)

( * ) Notice: Subject to any disclaimer, the term of this patent is extended or adjusted under 35 U.S.C. 154(b) by 786 days.

(21) Appl. No.: 09/791,007

(22) Filed: Feb. 22, 2001

(65) Prior Publication Data

US 2002/0116439 A1 Aug. 22, 2002

(51) Int. Cl.
*G06F 9/46* (2006.01)
*G06F 15/16* (2006.01)
*G06F 3/00* (2006.01)

(52) U.S. Cl. ................ 718/102; 709/229; 709/230; 709/250; 719/321; 719/327; 358/1.15

(58) Field of Classification Search ............. 718/1–108; 379/221.15, 901; 709/229, 230, 250; 719/327, 719/321; 358/1.15
See application file for complete search history.

(56) References Cited

U.S. PATENT DOCUMENTS

| 5,267,727 | A | 12/1993 | DeHority |
| 5,537,626 | A | 7/1996 | Kraslavsky et al. ......... 395/828 |
| 5,592,654 | A | 1/1997 | Djakovic ..................... 395/500 |
| 5,613,160 | A * | 3/1997 | Kraslavsky et al. ........... 710/16 |
| 5,771,339 | A | 6/1998 | Fromherz .................... 395/112 |
| 5,784,622 | A | 7/1998 | Kalwitz et al. .............. 395/726 |
| 5,825,361 | A | 10/1998 | Rubin et al. ................. 345/349 |
| 5,852,744 | A | 12/1998 | Agatone et al. ............. 395/837 |
| 5,949,978 | A | 9/1999 | Kondo et al. .......... 395/200.61 |
| 5,995,724 | A | 11/1999 | Mikkelsen et al. .......... 395/115 |
| 6,067,406 | A | 5/2000 | Van Hoof et al. ........... 395/109 |
| 6,088,120 | A * | 7/2000 | Shibusawa et al. ......... 358/1.15 |

(Continued)

FOREIGN PATENT DOCUMENTS

AU 2002244111 8/2006

(Continued)

OTHER PUBLICATIONS

Hewlett Packard, "Printer Job Language Technical Reference Manual", Oct. 1997, Edition 10, pp. 1-13.*

*Primary Examiner*—Meng-Ai An
*Assistant Examiner*—Kenneth Tang
(74) *Attorney, Agent, or Firm*—Michael A. Glenn

(57) ABSTRACT

A method for dynamically managing printers comprises a mechanism for printing from a network of printers that belong to a virtual printer group to meet the user's request for printing. The invention does this by requesting an options and capabilities file from each printer and then generating a virtual printer group, such that when a user wants to print a file, the invention looks for the best suited printer for the user and sends a file to that printer for printing. The invention has the capability to keep track of each printer's printing capabilities dynamically and to communicate to the user about the status of printing and printer location, and of informing a system administrator for manual intervention should the need arise.

44 Claims, 6 Drawing Sheets

U.S. PATENT DOCUMENTS

| | | | |
|---|---|---|---|
| 6,598,087 B1 * | 7/2003 | Dixon et al. | 709/236 |
| 6,606,165 B1 * | 8/2003 | Barry et al. | 358/1.9 |
| 6,762,852 B1 * | 7/2004 | Fischer | 358/1.15 |
| 6,772,396 B1 * | 8/2004 | Cronin et al. | 715/523 |
| 6,816,275 B1 * | 11/2004 | Aoki | 358/1.15 |
| 2003/0011805 A1 * | 1/2003 | Yacoub | 358/1.15 |

FOREIGN PATENT DOCUMENTS

| | | | |
|---|---|---|---|
| EP | 0 602 787 A2 | 6/1994 | 29/6 |
| EP | 0 917 044 | 5/1999 | |
| EP | 02709636.1 | 5/2007 | |
| GB | 2 351 374 | 12/2000 | |
| WO | PCT/US2002/005272 | 6/2003 | |

* cited by examiner

| | |
|---|---|
| Print Request : | Print |
| | Print and Hold |
| | Rip |
| | Rip and Hold |
| Save Fast Reprint : | Yes/No |
| Number of Copies : | Number |
| Page Range : | From |
| | To |
| | Page Numbers |
| Page Order : | Forward |
| | Reverse |
| Lines Per Inch : | 300 |
| | 600 |
| | 1200 |
| | 1800 |
| | Default |
| Job Fonts : | |
| Duplex : | On or Off |
| Job Language : | Select |

} Job Definition

*FIG. 3A*

Orientation :     Portrait
                  Inverse Portrait
                  Landscape
                  Inverse Landscape Scale :           Scale to Fit
                  Scale Percent Rotate :          None
                  90                    } Job Layout
                  180

Face Down :       Yes
                  No

Duplex :          None
                  Top to Top
                  Top to Bottom

*FIG. 3B*

Brightness  
Copier Mode  
Digital Press Mode  
Text Graphics Enhance  
Sharpness  
Black Detection  
Glossy Adjust  
Gradiation Smoothing  
Toner Reduction  
Ink Separations  
} Job Quality Data Files  
Variable Data  
Watermarks :   Text  
                Font  
                Size  
                Color  
                Saturation  
                Intensity  
                Position Center  
                Off From Center  
                Style  
Images :     File Name  
                File Format  
} Job Content

*FIG. 3C*

METHOD AND APPARATUS FOR AUTOMATICALLY MANAGING CAPABILITIES IN A VIRTUAL PRINTER GROUP

TECHNICAL FIELD

The invention relates to a software management of workflow as it relates to printing from a variety of different printers with differing capabilities that are not necessarily situated at the users workspace.

DESCRIPTION OF PRIOR ART

In a network system, when a user issues a print job on his computer, a print server managing a plurality of printers selects a printer for executing the print job in accordance with a particular print attribute or a printer's capability. In prior art systems, there are difficulties relating to the printer capabilities and how they are handled. For example, printers that are networked to form one virtual printer group usually have similar capabilities but may be situated at different locations. Printers having different capabilities and situated at different locations are usually not made a part of the same virtual print group.

In prior art systems, managing of printers with similar capabilities at different locations is not difficult for the user who is printing a document at a given time. However, a printer at one location may have such problems as paper jamming, toner needing replacement, paper needing loading, and similar servicing. A user is often tied to the proper functioning of a particular printer that his computer is networked to use. The user in prior art has to know before hand the capabilities and/or location, of the printer he is trying to print his job on. If that particular printer has problems, his time is wasted looking for the paper jam, replacing the toner, loading the paper, or looking for an administrator to fix the problem. The problem is worsened if the printers are situated at different locations of a big building. If the printer is not working, many jobs are put on hold until the printer is fixed. In such situations, previously submitted print jobs are lost and the user is left with the only choice of reprinting his job after he finds the printer is again enabled. The user is usually informed by the administrator via electronic mail about the lost jobs due to printer failure without indication of the nature of the job lost.

In some other prior art systems, each printer is assigned a printer capabilities file, also called job ticketing or Postscript Printer Definition (PPD), which specifies each printer's capability. A PPD is specific to a certain printer. For example, a printer has a stacker, or handles 11 in.×17 in. paper, such capability is identified in its PPD.

Having a PPD file specific to a printer is not of use to a user who wants to submit his job with a request for certain printing options but does not want to worry about where the printer is located, if the printer he wants to use is working, if it has enough toner, or if the paper is jammed in that particular printer.

What is missing in the prior art, is a method for dynamically managing a user's workflow for printing in a way that takes advantage of the printer capabilities of a number of different printers and that informs the user of the status of his printing and location of the printer where he could pick up his job.

SUMMARY

The invention relates to software implemented management of a workflow as it relates to printing at various printers that are not necessarily situated proximate to the user's workspace. The printers are networked to form a virtual printer group, such that the user has only to put forth a request for printing.

The invention provides a mechanism that meets the user's request by matching printing options requested by the user to the options available on the automatic virtual printer group. The virtual printer group can be managed from an internal database. The internal database contains each printer's capabilities in a file. The database can be individually populated via a query over the network by the software. In turn, the virtual printer group capabilities can be automatically on the fly updated by the software, which looks at both the internal database, or the printers response to various queries on capabilities and status. The mechanism, while satisfying the user's request for printing, dynamically keeps track of each printer's printing capabilities and saves the status into the internal database.

A key aspect of the invention is that a mechanism is provided that can automatically summarize and display to the user all of the capabilities of a given virtual printer group.

In one of its embodiments, the invention provides a feature to inform the user about the status of the print job. The invention also includes a feature that informs a system administrator should a particular printer require manual intervention. If a printer is not able to reply about it's printing options and capabilities, or if the printer capabilities are not matched to the capabilities already stored in the internal database, then printing is administered by the software administrator after a prompt from the invention to the system administrator for manually uploading the printer capabilities file. The administrator is given the choice to use a default capabilities file from the software database.

DETAILED DESCRIPTION

The invention provides a solution to the workflow problems experienced by users when printing documents on printers that have unique features and unique limitations. Traditionally, printers all have different capabilities and feature sets available. These are features that include, for example, finishing options, color rendering, color intent options, media size, and tray selection. The problem comes when all the printers are grouped into one virtual printer group for access by the user or by another software program. This is so because when different printers having different capabilities are grouped together, the individual capabilities of the printer's lose accessibility, e.g. by traditional methods, such as user selection, because they have very different features and yet are put together into one group. Thus, the group comprises a superset of features that are not user accessible.

The solution relates to software for managing the workflow as printing is done from various printers at various locations besides the user's location. The printers in the current embodiment of the invention are networked to form a virtual printer group, which is identified in a file that is stored in an internal database. In such embodiment, a user makes a request for printing to a virtual printer group. The virtual printer group is formed from a network of printers that is identified in an internal database. The invention keeps track of each printer's printing capabilities and communicates to the user about the status of printing and printer location, while informing a system administrator if manual intervention is needed.

Figure 1:
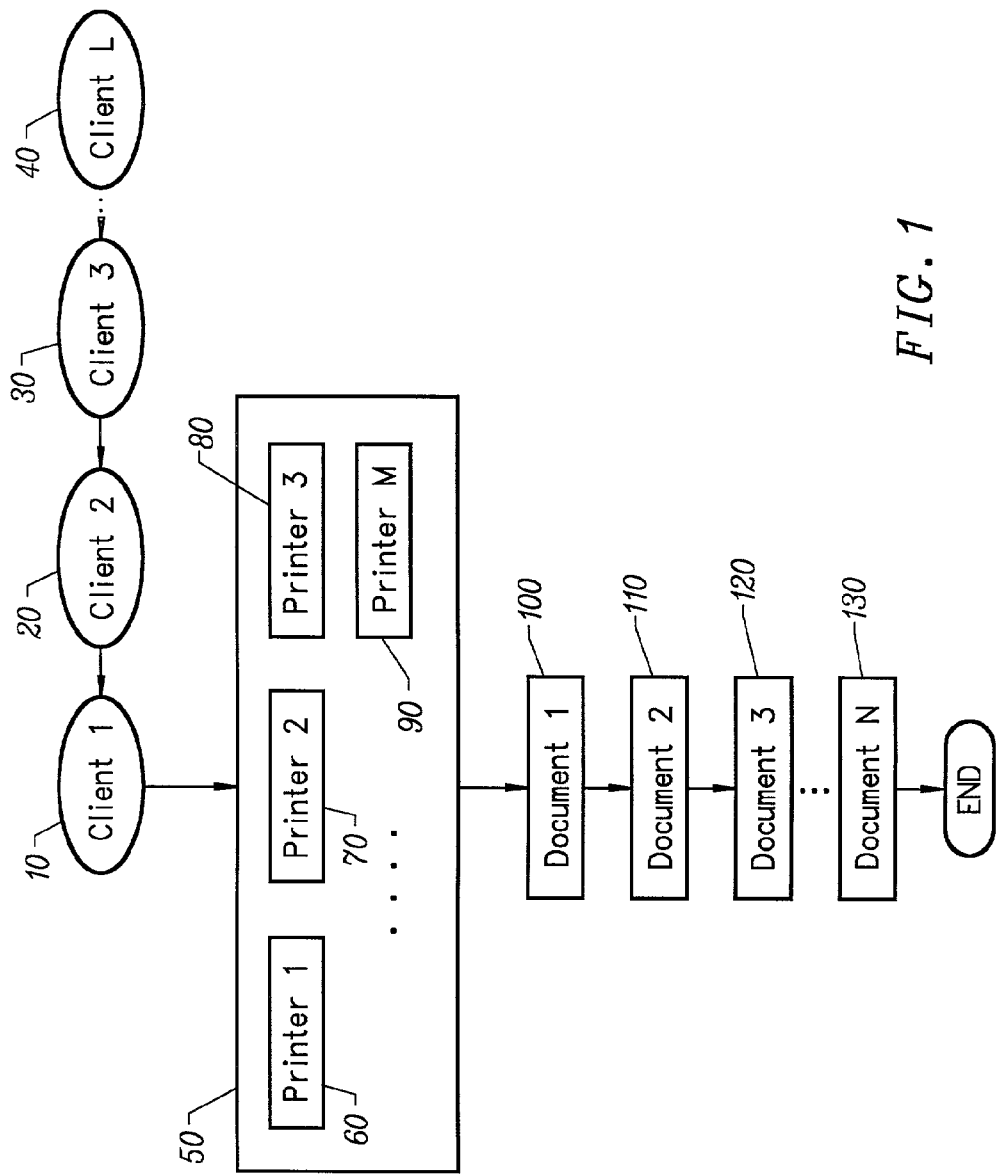
FIG. 1 is an illustration of printing apparatus for dynamic printing according to the invention.

The virtual printer group forms a search engine for the user's request for printing. FIG. 1 is an illustration of the printing apparatus according to a presently preferred embodiment of the invention. The printing apparatus comprises a job accessing module that accesses a multiplicity of printers 60, 70, 80 and 90 to build a printer capabilities file. The invention includes a mechanism that dynamically accesses each printer's printer capabilities file. The printers 60, 70, 80 and 90 shown in FIG. 1 form part of a virtual printer group such that when a multiplicity of users, such as Client 1 10, Client 2 20, Client 3 30, or Client N 40 send their requests for printing, they send their request to the virtual printer group 50 with their printing options to enable printing their documents, such as Document 1 100, Document 2 110, Document 3 120, or Document N 130, uniquely.

When an administrator sets up or modifies a printing group, he only has to put forth the printer names or addresses on the network. The invention includes a module (FIG. 2) that talks to the printers to find out what options and capabilities they have. The language of this discussion is currently a proprietary software protocol. For printers that do not use the protocol, the module looks up the capabilities of that model of printer via the web or internal database. The system accesses the virtual printer group for printer capabilities [S1]. The system then merges [S2] the printer capabilities to create a super print capabilities file for the virtual printer group.

Figure 2:
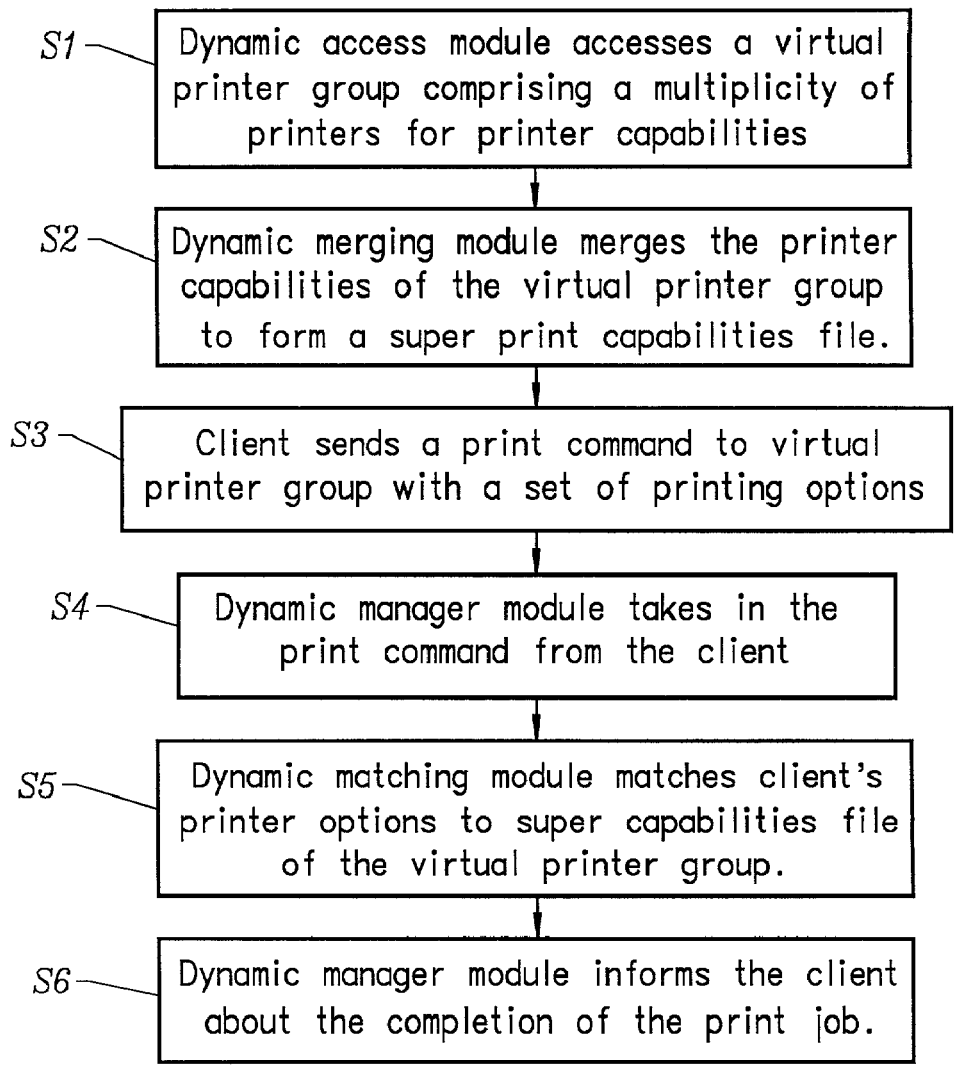
FIG. 2 is a flow diagram showing the steps involved in dynamic printing when a user sends a request for printing to a virtual printer group according to the invention.

FIG. 2 is a flow diagram of steps involved in printing when a user sends a request for printing [S3] to the virtual printer group 50 (FIG. 1) with a set of print options. The system then takes in the print command [S4] and matches [S5] the user's print options to the super capabilities file of the virtual printer group. The system informs the user about the completion of the job [S6] once the job is completed.

The printer capabilities are generally in a format referred to as a Printer Postscript document (or PPD) but the invention is not limited to PPDs alone. Other formats for which the invention applies equally are, for example, Job Definition Format (or JDF) and Printer Job Language (PJL). The protocol for communication between the software and the printers is not limited to EFI Harmony but could be any suitable protocol, such as SNMP (Simple Network Management Protocol), IPP, or JDF (Job Definition Format).

The internal database stores each and every printer capabilities file once the printers are all networked to the user's computer. The system, while satisfying the user's request for printing, keeps track of each printer's printing capabilities and saves the status of each printer into the internal database.

Figure 3D:
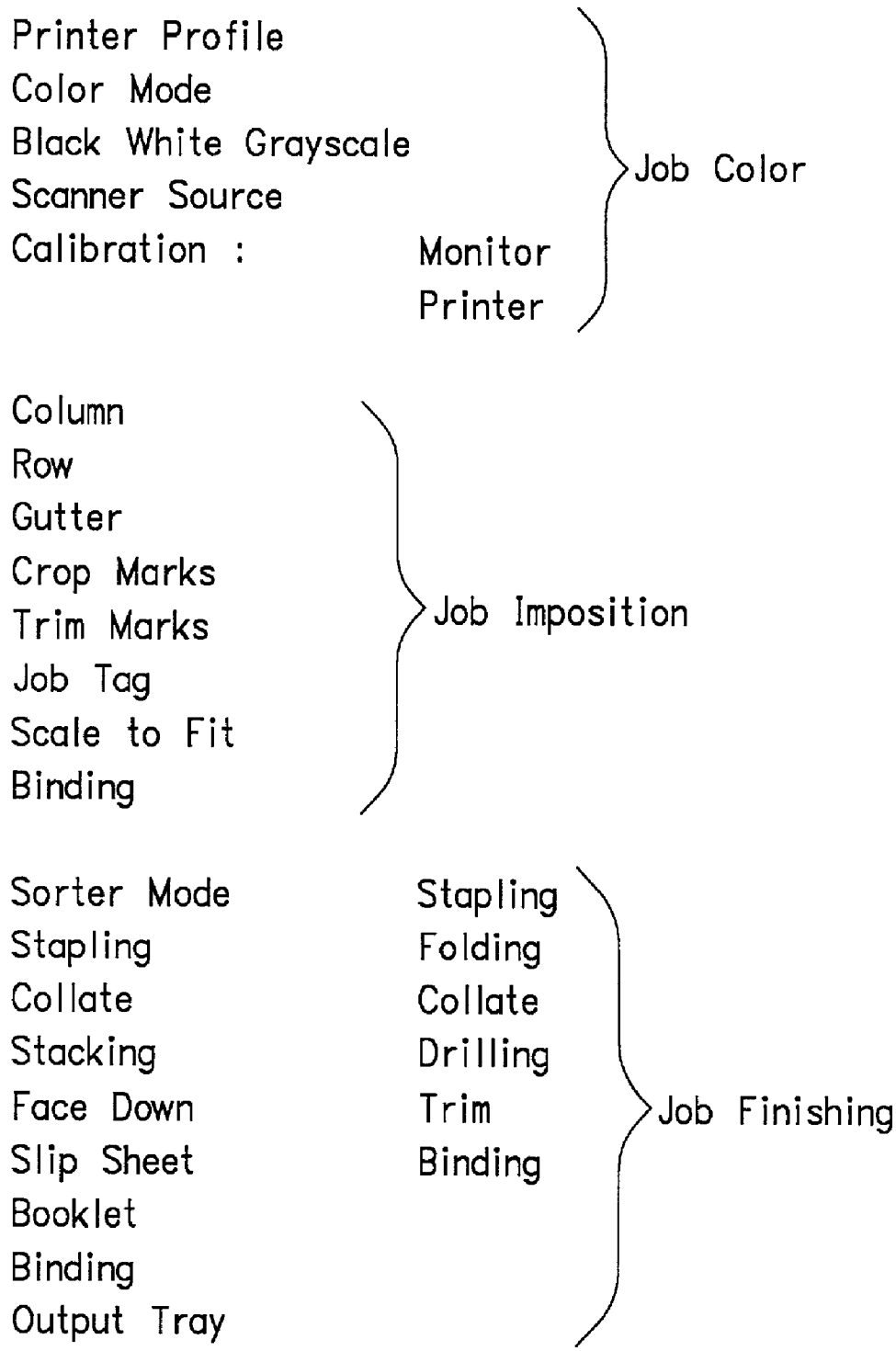
FIG. 3 is an illustration of a super print capabilities file for a virtual printer group invoked by the invention to meet user's request for printing.

FIG. 3 is an illustration of a super print capabilities file for a virtual printer group. The file is invoked by the system to meet client's request for printing. Some of these capabilities include, for example, options for color rendering, staples or no staples, split sheet capability, option for bypass tray to put cards, cover inserter, color brightness, page range for printing, page order being forward or reverse, lines per inch in the document being a range from 300 to 1800 and more specifically 300, 600, 1200 and 1800 lines per inch, job fonts, duplex option for top to top printing vs. top to bottom printing, glossy adjust and gradation smoothing for quality of printing, ink separation, screening parameters for quality of printing, color matching, folding, binding, collating, booklet making, slip sheet, drilling, and trimming for job finishing. These options constitute broad capabilities for printing such as: job layout, job definition, job quality, job content, job description, job color, job imposition and job finishing. The invention makes all of these capabilities available to every user of the virtual printer group, even though no one printer in the group alone possesses all of these capabilities. It will be appreciated that the user may have to select among the capabilities that are available, but that they are not all available at the same time, although the user may select among all of such capabilities at the same time.

In one embodiment of the invention, the system informs the user about the status of the print job. The system also informs a system administrator if a particular printer requires manual intervention. If a printer is not able to reply about it's printing options and capabilities, or if the printer capabilities are not matched to the capabilities already stored in the internal database, then the print job is administered by the system administrator after a prompt is provided from the system to the system administrator alerting the system administrator that he must manually upload the printer capabilities file. The system administrator is given the choice of using a default capabilities file from the software database.

Often a printer's capabilities file may say that it is capable having a certain feature, like a stapler, but the stapler may be disconnected or broken. The software should optionally mask or gray features that are normally available but currently out of service, giving the user a method to also automatically notify the service person.

In the future, printers may have a sensor which automatically detects paper type and amount, i.e. via a barcode reader. The invention can also report that information to the user.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method comprising:

forming a virtual printer group comprising a plurality of printers having different capabilities, each printer comprising a corresponding printer capabilities file that specifies a capability of the printer;

accessing the printer capabilities file of each printer to determine the capability of each printer in the virtual printer group, wherein determining comprises obtaining a list of printer options, and wherein obtaining a list of printer options comprises obtaining media size options;

merging the determined printer capabilities to create a super print capabilities file;

receiving a print command that comprises a set of printing options;

matching the print options to the super print capabilities file; and executing the print command on one or more printers in the virtual printer group based on the matched print options.

2. The method of claim 1, wherein determining comprises invoking a printing protocol.

3. The method of claim 1, wherein determining comprises obtaining a Printer Postscript Definition file.

4. The method of claim 1, wherein determining comprises obtaining a Job Definition File.

5. The method of claim 1, wherein determining comprises obtaining a Printer Job Language File.

6. The method of claim 1, wherein obtaining a list of printer options comprises obtaining printer tuning options.

7. The method of claim 1, wherein obtaining a list of printer options comprises obtaining tray selection options.

8. The method of claim 1, wherein obtaining a list of printer options comprises obtaining color rendering options.

9. The method of claim 1, wherein obtaining a list of printer options comprises obtaining staple options.

10. The method of claim 1, wherein obtaining a list of printer options comprises obtaining split sheet options.

11. The method of claim 1, wherein obtaining a list of printer options comprises obtaining a bypass tray option to put cards.

12. The method of claim 1, wherein obtaining a list of printer options comprises obtaining orientation options.

13. The method of claim 1, wherein obtaining a list of printer options comprises obtaining cover insert options.

14. The method of claim 1, wherein obtaining a list of printer options comprises obtaining color brightness options.

15. The method of claim 1, wherein obtaining a list of printer options comprises obtaining toner reduction options.

16. The method of claim 1, wherein obtaining a list of printer options comprises obtaining number of copies options.

17. The method of claim 1, wherein obtaining a list of printer options comprises obtaining page range options.

18. The method of claim 1, wherein obtaining a list of printer options comprises obtaining page order options.

19. The method of claim 1, wherein obtaining a list of printer options comprises obtaining liner per inch options.

20. The method of claim 1, wherein obtaining a list of printer options comprises obtaining job fonts options.

21. The method of claim 1, wherein obtaining a list of printer options comprises obtaining duplex options.

22. The method of claim 1, wherein obtaining a list of printer options comprises obtaining scale to fit option.

23. The method of claim 1, wherein obtaining a list of printer options comprises obtaining scale to percent options.

24. The method of claim 1, wherein obtaining a list of printer options comprises obtaining rotate options.

25. The method of claim 1, wherein obtaining a list of printer options comprises obtaining face down option.

26. The method of claim 1, wherein obtaining a list of printer options comprises obtaining glossy adjust options.

27. The method of claim 1, wherein obtaining a list of printer options comprises obtaining gradation smoothing options.

28. The method of claim 1, wherein obtaining a list of printer options comprises obtaining ink separation options.

29. The method of claim 1, wherein obtaining a list of printer options comprises obtaining screening parameters option.

30. The method of claim 1, wherein obtaining a list of printer options comprises obtaining calibration of printer options.

31. The method of claim 1, wherein obtaining a list of printer options comprises obtaining calibration of monitor options.

32. The method of claim 1, wherein obtaining a list of printer options comprises obtaining folding options.

33. The method of claim 1, wherein obtaining a list of printer options comprises obtaining binding options.

34. The method of claim 1, wherein obtaining a list of printer options comprises obtaining collating options.

35. The method of claim 1, wherein obtaining a list of printer options comprises obtaining booklet options.

36. The method of claim 1, wherein obtaining a list of printer options comprises obtaining slip-sheet options.

37. The method of claim 1, wherein obtaining a list of printer options comprises obtaining drilling options.

38. The method of claim 1, wherein obtaining a list of printer options comprises obtaining trimming options.

39. The method of claim 1, wherein determining further comprises determining the capability of a printer via an internal database.

40. The method of claim 1, wherein determining further comprises matching a printer of a known printer type with a known Printer Postscript Definition file.

41. The method of claim 1, wherein determining further comprises using a default capabilities file.

42. The method of claim 1, further comprising sending an electronic message when printing is completed.

43. The method of claim 42, further comprising sending an electronic message about a location where said printing is executed.

44. The method of claim 42, further comprising sending an electronic message to the client about any changes in job status.

* * * * *